(12) United States Patent
Sato

(10) Patent No.: US 7,548,739 B2
(45) Date of Patent: Jun. 16, 2009

(54) APPARATUS FOR RECEIVING RADIO SIGNAL USING MAGNETIC OSCILLATOR

(75) Inventor: Rie Sato, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 431 days.

(21) Appl. No.: 11/232,972

(22) Filed: Sep. 23, 2005

(65) Prior Publication Data

US 2006/0166636 A1    Jul. 27, 2006

(30) Foreign Application Priority Data

Jan. 24, 2005    (JP) .............................. 2005-015662

(51) Int. Cl.
*H04B 1/06* (2006.01)
(52) U.S. Cl. ........................ 455/258; 455/284; 455/293; 331/177 R
(58) Field of Classification Search .............. 455/195.1, 455/196.1, 255, 257, 258, 280, 283, 284, 455/293, 308, 309, 323; 331/47, 48, 177 R, 331/179
See application file for complete search history.

(56) References Cited

U.S. PATENT DOCUMENTS

| | | | | |
|---|---|---|---|---|
| 4,318,061 A | * | 3/1982 | Castera et al. .......... 331/107 A |
| 5,654,641 A | * | 8/1997 | Query et al. ................. 324/529 |
| 6,326,856 B1 | * | 12/2001 | Andersson .................... 331/68 |
| 6,516,187 B1 | * | 2/2003 | Williams et al. ............ 455/313 |
| 6,566,872 B1 | * | 5/2003 | Sugitani ..................... 324/249 |
| 7,054,088 B2 | * | 5/2006 | Yamazaki et al. ............. 360/65 |
| 2004/0012520 A1 | * | 1/2004 | Talbot et al. ........... 342/357.08 |
| 2007/0285184 A1 | * | 12/2007 | Eyckmans et al. ...... 331/107 R |

FOREIGN PATENT DOCUMENTS

| | | |
|---|---|---|
| JP | 60-257614 | 12/1985 |
| JP | 6-181349 | 6/1994 |
| JP | 2003-123204 | 4/2003 |
| JP | 2003-207553 | 7/2003 |
| JP | 2003-289148 | 10/2003 |
| JP | 2004-326878 | 11/2004 |

OTHER PUBLICATIONS

H. Okamura, "Structure and Application of Hard Disk Drive", CQ Publishing, May 1, 2002, pp. 210, 211, 214, 215.

* cited by examiner

*Primary Examiner*—Nhan T Le
(74) *Attorney, Agent, or Firm*—Oblon, Spivak, McClelland, Maier & Neustadt, P.C.

(57) ABSTRACT

A receiver apparatus includes a preamplifier to amplify an input signal, an equalizer configured to subject an amplified signal to an equalization process, an identification reproducer to reproduce the input signal based on an output signal of the equalizer, and a magnetic oscillator arranged on a pre-stage of the preamplifier to improve a SN ratio of the input signal.

20 Claims, 3 Drawing Sheets

APPARATUS FOR RECEIVING RADIO SIGNAL USING MAGNETIC OSCILLATOR

CROSS-REFERENCE TO RELATED APPLICATIONS

This application is based upon and claims the benefit of priority from prior Japanese Patent Application No. 2005-015662, filed Jan. 24, 2005, the entire contents of which are incorporated herein by reference.

BACKGROUND OF THE INVENTION

1. Field of the Invention

This invention relates to a high frequency signal receiver apparatus of a microwave band, particularly a receiver apparatus using a magnetic oscillator.

2. Description of the Related Art

A high frequency receiver is used for a magnetic recording apparatus to process a signal at several 100 Mb/s to 1 Gb/s or for microwave communication of transmitting and receiving a signal at a transmission rate of several Gb/s. A conventional receiver amplifies a weak digital signal with a low noise preamplifier, subjects the amplified signal to an equalization process such as correction of frequency characteristic, power amplification and out-of-noise cancellation with an equalizer, reproduces an input signal waveform with an identification reproducer, and determines ON/OFF of the signal.

In a conventional high frequency circuit, an equalizer is provided after a preamplifier for the purpose of improving an error rate. However, a noise unable to be removed with the equalizer exists. This adversely affect ON/OFF determination of the input signal. In other words, this reduces the error rate. For this reason, it is necessary to reduce the noise of an amplifier for amplifying an input signal, particularly a preamplifier. For example, it is necessary for receiving a weak signal including only a power corresponding to a heat noise power of about 4 kTΔf to use a high performance heterodyne detection amplifier. However, this amplifier is generally expensive, so that the receiver becomes very expensive.

It is an object of the present invention to provide an inexpensive high frequency receiver apparatus having an excellent error rate.

BRIEF SUMMARY OF THE INVENTION

An aspect of the present invention provides a receiver apparatus includes a preamplifier to amplify an input signal, an equalizer configured to subject an amplified signal to an equalization process, an identification reproducer to reproduce the input signal based on an output signal of the equalizer, and a magnetic oscillator arranged on a pre-stage of the preamplifier to improve a SN ratio of a minute signal.

DETAILED DESCRIPTION OF THE INVENTION

There will be now described an embodiment of the present invention in conjunction with accompanying drawings.

Figure 1:
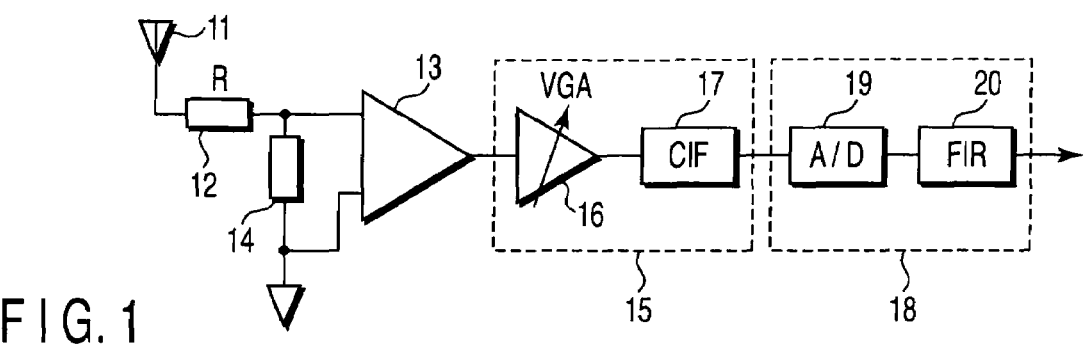
FIG. 1 shows a circuit structure of a high frequency digital receiver according to an embodiment of the present invention.

FIG. 1 shows a circuit structure of a receiver apparatus of the embodiment of the present invention. According to FIG. 1, an antenna 11 is connected to one input terminal of a pre-amplifier 13 via a matching resistor (R) 12. A magnetic oscillator 14 is connected between one terminal of the preamplifier 13 and the other terminal thereof. In other words, the magnetic oscillator 14 is connected in parallel with the pre-stage of the preamplifier 13. This magnetic oscillator 14 oscillates due to supply of a current, and has a function of improving the SN ratio of the signal.

An equalizer 15 is connected to the rear stage of the preamplifier 13, that is, the output terminal thereof. The equalizer 15 comprises a variable gain amplifier 16 connected to the output terminal of the preamplifier 13 and a continuous time filter 17 connected to the output terminal of the variable gain amplifier 16. The equalizer 15 subjects the output signal of the amplifier 13 to a process such as correction of frequency characteristic, power amplification and cancellation of out-of-band noise. The output terminal of the equalizer 15, that is, the output terminal of the continuous time filter 17 is connected to an identification reproducer 18. The identification reproducer 18 comprises a AD converter (analog-to-digital converter) 19 connected to the output terminal of the equalizer 15 and a FIR filter 20 connected to the output terminal of the AD converter 19. The identification reproducer determines ON/OFF of the output signal of the equalizer 15, in other words, the input signal to the receiver apparatus to reproduce an input signal waveform. In this way, ON/OFF of the signal is determined after amplification thereof because it is difficult due to a weak input signal power to determine ON/OFF of the signal in the input stage.

The magnetic oscillator 14 comprises an element having a laminated structure of a ferromagnetic layer 1 as a magnetic resonance layer, a nonmagnetic layer 2 and a ferromagnetic layer 3 as a magnetic resonance layer. The magnetic resonance layers 1 and 3 are configured so that their resonance frequencies coincide with each other. The ferromagnetic layers 1 and 3 are connected to upper and lower terminals 4 and 5, respectively.

Figure 4:
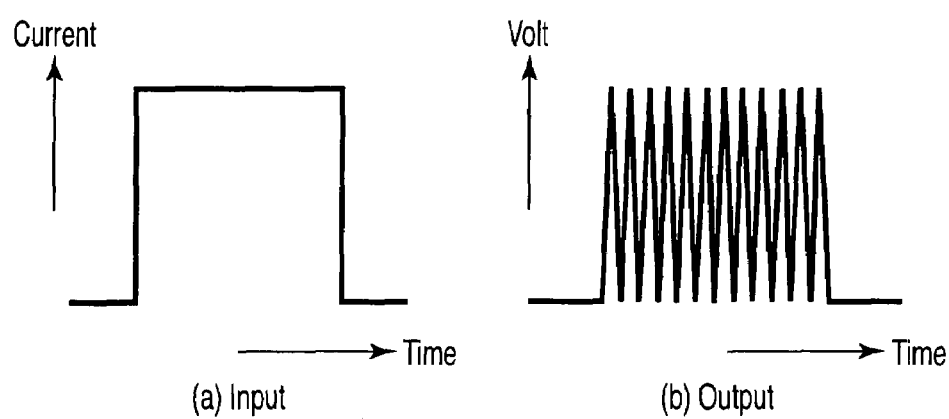
FIG. 4 shows an input current pulse and an output voltage pulse to the magnetic oscillator, respectively.

The static current-voltage characteristic of the magnetic oscillator 14 is shown in FIG. 4. According to this characteristic curve, in a current domain not less than a threshold current Ith, a voltage ΔV added to a voltage VoI across the resistor Ro is generated between the upper and lower electrodes 4 and 5. A microwave oscillation of an amplitude $(2\Delta V)^{1/2}$ and a frequency 2 fo occurs in a current domain not less than the threshold Ith in terms of high frequency, where fo indicates the resonance frequency of the ferromagnetic layer. Assuming that a resonance frequency is set at 50 GHz in the FIG. 2 element including a laminated structure (ferromagnetic layer/non-magnetic layer/ferromagnetic layer). When the threshold current Ith is several μA, ΔV is 0.2 to 0.5 mV, Ro is several Ω, and an input current pulse shown in FIG. 4(a) is supplied to the magnetic oscillator, a high frequency voltage pulse of 100 GHz shown in FIG. 4(b) is output from the magnetic oscillator. The SN ratio of the time averaged value of the output pulse is about 100 (40 dB).

In the circuit of FIG. 1, when a high frequency signal is received via the antenna, the received signal is input to the preamplifier 13 via the matching resistor 12. In this time, the magnetic oscillator 14 oscillates according to the received signal, that is, input signal to improve the SN ratio of the signal. The preamplifier 13 amplifies the input signal, and inputs the amplified signal to the equalizer 15. The equalizer 15 subjects the amplified input signal to an equalizing process such as correction of frequency characteristic, power amplification and cancellation of out-of-band noise. The output signal of the equalizer 15 is input to the identification reproducer 18 to determine ON/OFF of the input signal. In the way, according to the present embodiment, the noise component is suppressed by the magnetic oscillator 14, and thus the input signal can be reproduced at high performance.

Figure 8:
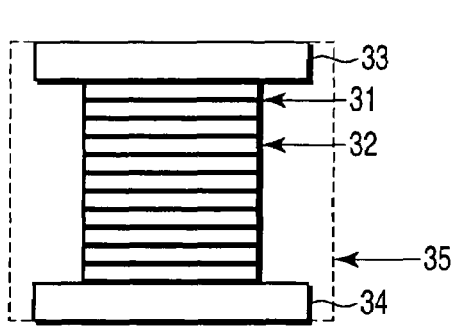
FIG. 8 shows a schematic cross-sectional view of another magnetic oscillator.

The magnetic oscillator comprises practically a magnetic oscillator having a N-layered structure (ferromagnetic layer 31/non-magnetic layer 32)$^N$ shown in FIG. 8. The threshold current of the magnetic oscillator and the SN ratio of the output pulse thereof are the same as those of the element of FIG. 2. However, the oscillation voltage increases to N time (several mV) of that of the FIG. 2 element, and becomes sufficiently higher (about hundredfold) in comparison with a conventional preamplifier. In other words, in the circuit of FIG. 1, the noise produced in the preamplifier 13 and the equalizer 15 can be ignored.

The factor determining the SN ratio of the FIG. 1 circuit is a heat noise produced by the matching resistor R. When the band width Δf is 1 GHz, the noise power 4 kTΔf produced by the resistor (R) 12 of 300K is 17 pW. Therefore, the upper limit of the power SN ratio to the signal power of 1 nW is 1 nW/17 pW=60.4 (18 dB). As for the current SN ratio, when R=100Ω, the current I corresponding to the input power P of 1 nW is I=$(P/R)^{1/2}$=$(10-9/100)^{1/2}$A=3.16 μA. On the other hand, since the heat noise current produced by the resistor 11 is $(4kT\Delta f/R)^{1/2}$=0.4 μA, the current SN ratio 3.16/0.4=7.8(18 dB). In other words, the FIG. 1 circuit including the magnetic oscillator 14 can ignore the noise of the amplifier even if a standard amplifier is used. Therefore, a SN ratio close to the heat noise limit can be obtained.

Figure 5A:
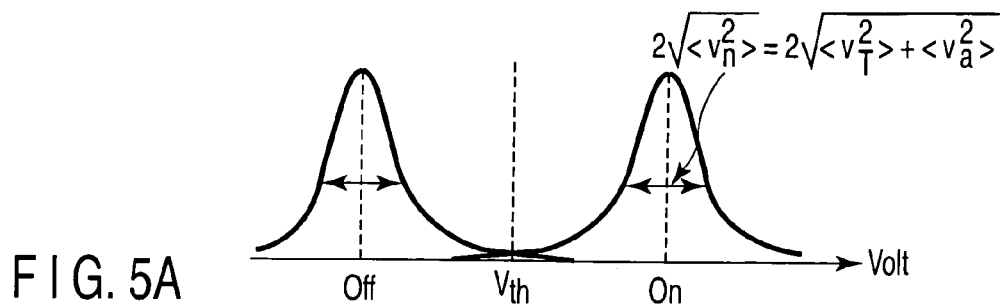
FIGS. 5A and 5B show a relation between a noise voltage and a bit error rate of a conventional receiver and a relation between a noise current and a bit error rate of the receiver of the embodiment of the invention, respectively.
Figure 5B:
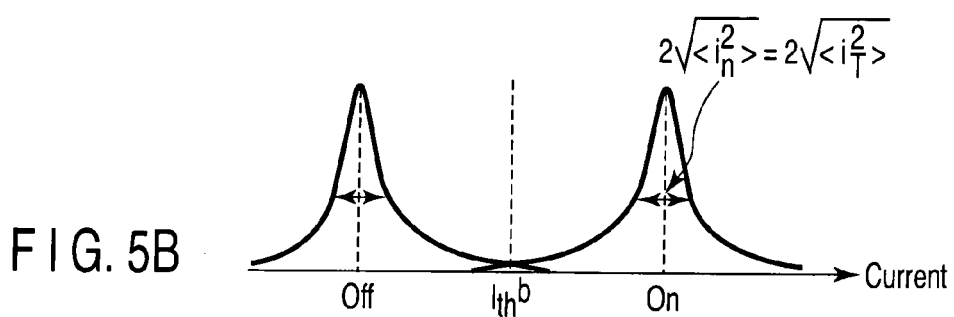

The above situation is shown in FIGS. 5A and 5B in view of a bit error rate. FIG. 5A shows a condition of bit determination of a conventional receiver, where a vertical axis indicates a voltage. The Gaussian distribution curve of a half value width $2(<Vn^2>)^{1/2}$ having a center in each of ON and OFF voltages represents fluctuations of ON and OFF voltages due to noise. $(<Vn^2>)^{1/2}$ indicates an actual value of the noise voltage, and corresponds to the sum of the heat noise $<VT^2>$ and the amplifier noise $<Va^2>$. The ON/OFF of the voltage is determined by comparison with the threshold voltage Vth set at an average of ON and OFF voltages. The error rate of determination (bit error rate) is proportional to an area of a superposed portion of the Gaussian distribution curves.

FIG. 5B shows a relation between a noise voltage and a bit error rate which concern the circuit of FIG. 1. ON/OFF determination is done by comparison with the threshold current Ith$^b$ set to an average of the ON and OFF currents. Assuming that ON and OFF currents are I$_{ON}$, and I$_{OFF}$, and the threshold of the magnetic oscillator is I$_b$, Ith$^b$=Ith−I$^b$=(I$_{ON}$+I$_{OFF}$)/2. This does not include the noise of the amplifier unlike FIG. 5B showing a relation between the noise voltage and bit error rate of a conventional receiver, but includes only the heat noise $(<iT^2>)^{1/2}$ of the matching resistor. As a result, the bit error rate can be reduced.

The above description assumes that the input signal is input from the microwave antenna. However, even if the input signal is produced by a sensor such as a GMR element or a TMR element, the bit rate can be improved by using a magnetic oscillator.

Figure 6:
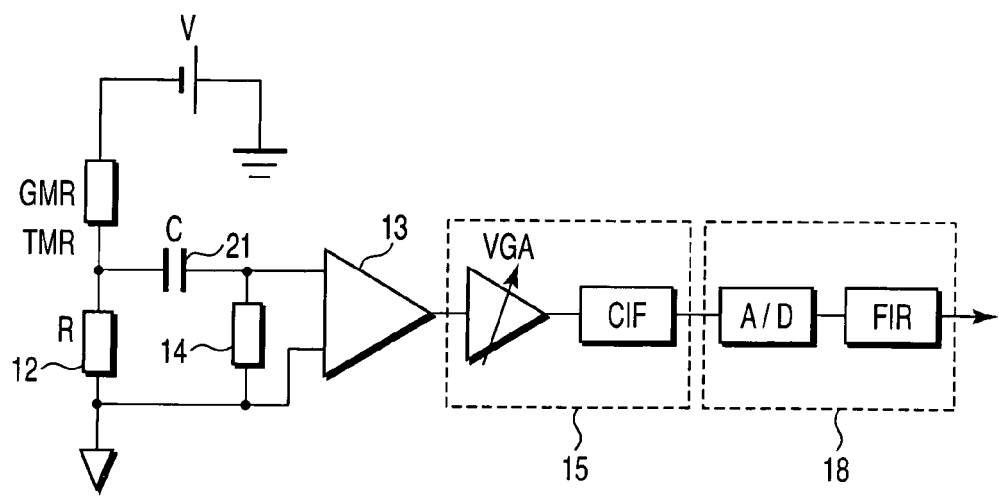
FIG. 6 shows a first example of a magnetic recording read out circuit.
Figure 7:
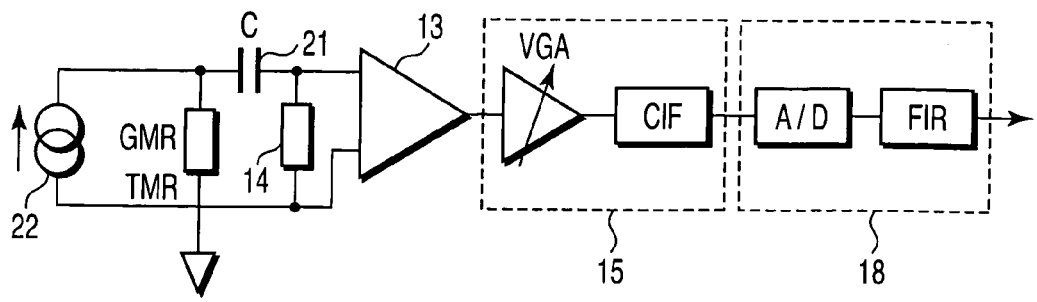
FIG. 7 shows a second example of a magnetic recording readout circuit.

In the FIG. 6 circuit, the GMR element or TMR element and the matching resistor (R) 12 are connected in series between the voltage source V and the ground. The node between the GMR element or TMR element and the matching resistor (R) 12 is connected to one terminal of the preamplifier 13 via the capacitor (C) 21. The other circuit structure is the same as the FIG. 1 circuit, and any further explanation is omitted for brevity's sake. According to this circuit, the signal produced by the GMR element or TMR element is input to the preamplifier 13 via the capacitor 21 and amplified. In this time, the oscillation voltage produced by the magnetic oscillator 14 increases in comparison with the noise voltage so as to be able to ignore the noise.

There will be described concrete examples of the magnetic oscillator applied to the embodiment of the present invention.

Figure 9:
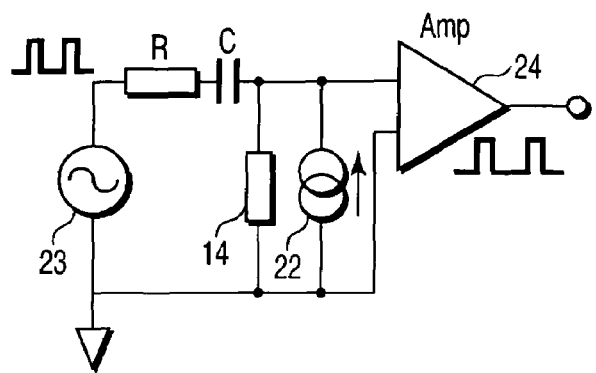
FIG. 9 shows a structure of an evaluation circuit using a magnetic oscillator.

The following describes a first example using a pulse generator 23 of FIG. 9 as a high frequency source and improving a SN ratio of a signal using a magnetic oscillator 14.

The element of FIG. 8 is fabricated on a Si substrate using a sputtering and an electron beam lithography. The ferromagnetic layers 31 each are formed of a FePt vertical magnetization film of about 1 nm in thickness, and the non-magnetic layers 32 each are formed of a Cu film of about 3 nm in thickness. The number of ferromagnetic layers 31 is 20, and the element size (the area of the laminated portion) is 100 nm×100 nm. Upper and lower electrodes 33 and 34 are arranged on the top and bottom of the laminated structure, respectively. The entire element is covered by a magnetic shield 35 of permalloy. The saturation magnetization M of the ferromagnetic layer 31 is 800 G, anisotropy magnetic field HK is 20 KOe, and resonance frequency fo is 56 GHz.

The element resistance Ro, threshold Ith and resonance voltage ΔV are 4Ω, 7.1 μA and 3 mV, respectively. The effective output resistance (ΔV/Ith)+Ro is 420Ω. This high frequency characteristic of the element is measured with the evaluation circuit of FIG. 9. In this evaluation circuit, a pulse oscillator 23 is connected in parallel with the magnetic oscillator 14 and a constant current source 22 via a serial circuit of a matching resistor R and a capacitor C, and to the input terminals of an amplifier 24.

The amplifier 24 uses a commercially available amplifier having a voltage gain of 20 dB, an input impedance of 10KΩ, a noise factor (NF) of 5 dB and a bandwidth of 1 GHz. The output pulse of the amplifier 24 is observed when a pulse signal having a pulse width of 0.5 ns and a repetitive frequency of 1 GHz is input from the pulse oscillator 23 to the amplifier 24. The output resistor R is 400Ω, and the capacitor is 10 pF. A bias current Ib of several μA is supplied from a dc current source to the magnetic oscillator. The output of the amplifier is observed with the pulse signal of 1 nW being applied to the amplifier 24 to flow a bias current of 5 μA therethrough. In this time, a good pulse signal having a voltage of 30 mV and a SN ratio of 84 (38 dB) is obtained.

Figure 10:
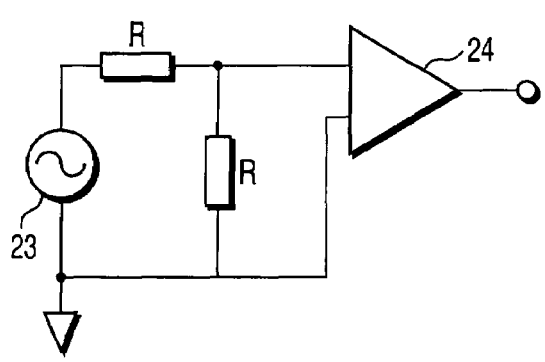
FIG. 10 shows an evaluation circuit using no magnetic oscillator.

On the other hand, when the FIG. 10 evaluation circuit having no magnetic oscillator is used, an output signal of a voltage 0.89 mV is observed for an input signal of 1 nW. However, the SN ratio is only 4.3 (12.7 dB). The output of the FIG. 9 circuit is connected to a commercially available signal evaluation device, and a bit error rate is evaluated while changing a bias current Ib. In this time, an error rate of about $6 \times 10^{-4}$ is obtained in Ib=5.9 μA. This value equals approximately the heat noise limit.

The following describes a second example using a magnetic sensor as a high frequency signal source.

Figure 2:
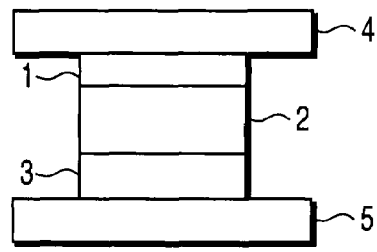
FIG. 2 shows a schematic cross-sectional view of a magnetic oscillator of the embodiment of the present invention.
Figure 3:
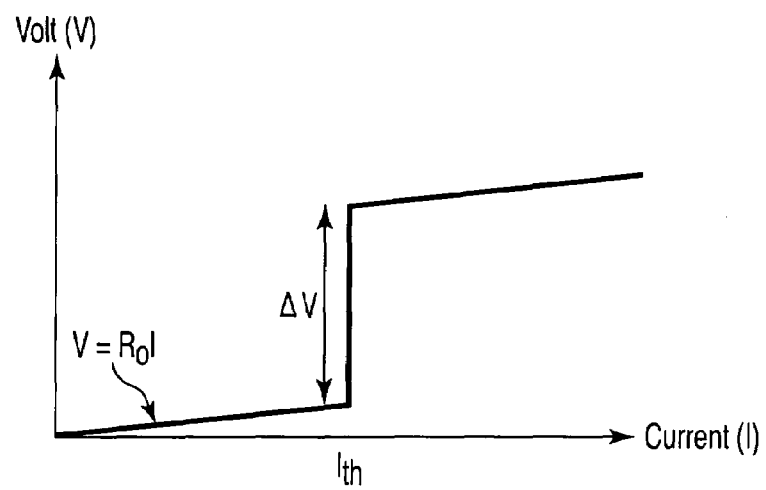
FIG. 3 shows a current-voltage characteristic of the magnetic oscillator.
Figure 11:
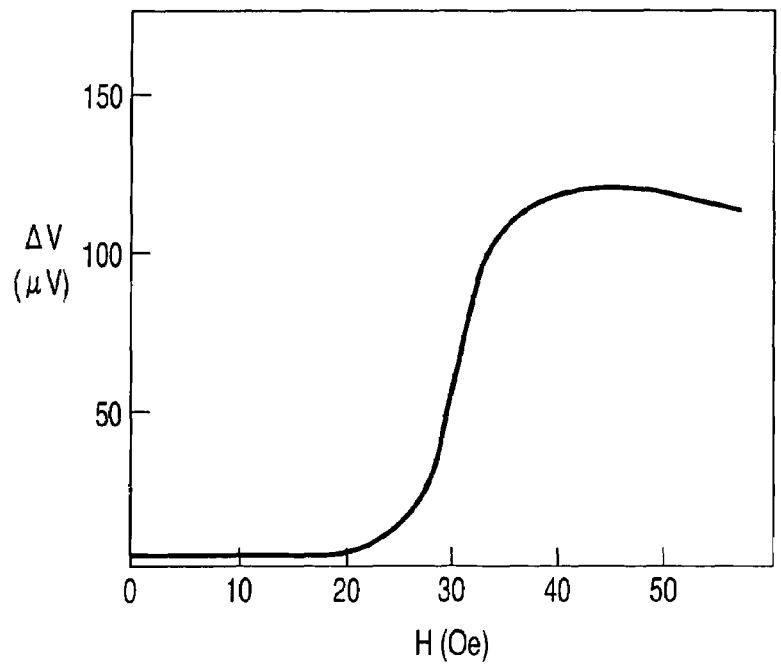
FIG. 11 shows a magnetic field-voltage curve of a magnetic sensor using the magnetic oscillator.

A magnetic oscillator of 100 nm×100 nm size, which is two laminated structures each having the structure (ferromagnetic layer 1/non-magnetic layer 2/ferromagnetic layer 3) of FIG. 2 is fabricated on a sapphire substrate. The ferromagnetic layer 1 is formed of a Co layer of about 2 nm in thickness, the non-magnetic layer 2 is formed of a Cu layer of 3 nm in thickness, and the ferromagnetic layer 3 is formed of a Co layer (vertical magnetization film) of about 1 nm in thickness. The resonance frequency of the Co vertical magnetization film of the ferromagnetic layer 3 is 9.8 GHz, and the resonance frequency of the Co film of the ferromagnetic layer 1 is 9.65 GHz when a bias magnetic field of 480 Oe is applied to a film surface. In OFF, the resistance R0 is 1Ω, the threshold current is 1.4 μA, and the resonance voltage ΔV is 0.12 mV. The effective resistance (ΔV/Ith)+Ro is 87Ω. When an external magnetic field is applied to this element with the current of 2 μA flowing therethrough, the resonance frequency of the Co layer of the ferromagnetic layer 1 varies so that the resonance voltage ΔV varies as shown in FIG. 11.

Figure 12:
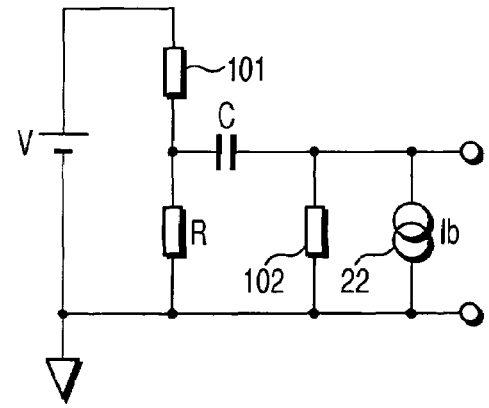
FIG. 12 shows a structure of a readout magnetic head using two magnetic oscillators.

A magnetic oscillator similar to that of the first example except for changing the FePt film to a Co vertical magnetization film 3 is fabricated together with the magnetic oscillator of the first example on the same substrate to provide a readout magnetic head shown in FIG. 12, which includes magnetic oscillators 101 and 102. According to FIG. 12, a serial circuit of the magnetic oscillator 101 and a matching resistor R is connected in parallel with the power source V. The matching resistor R is connected in parallel with the magnetic oscillator 102 and a constant current source 22. The resonance frequency fo of the magnetic oscillator 102 is 9.8 GHz, and the element resistance Ro, the threshold current Ith and resonance voltage ΔV are 4Ω, 1.2 μA and 0.6 mV, respectively. The effective output resistor (ΔV/Ith)+Ro is 504Ω.

Assuming that V=1.5 mV, and the resistor R and the capacitor C have 1KΩ and 10 pF, respectively, and Ib is a bias current source of the element 102. In the case of an external field is less than 20 Oe, the element 101 is OFF, and the voltage between the terminals of the element 101 is about 1.5 μV. However, when a signal magnetic field (external magnetic field) of 50 Oe is applied to the element 101, a voltage of 0.12 mV is produced in the element 101, and the signal current flowing through the element 101 is about −2.4 μA. The bias current Ib is adjusted to 2.4 μA, and the determination threshold current $Ith^b$ is set to Ith−Ib=−1.2 μA=−2.4/2 μA. The magnetic head is mounted on a commercially available evaluation device of 300 Mbps to measure a bit error rate. As a result, an error rate of $1 \times 10^{-8}$ is obtained. This value corresponds to an error rate when the SN ratio of the signal including an amplifier noise is 21 dB.

According to the invention as described above, a magnetic oscillator which magnetically oscillates by supplying a current thereto is connected to a pre-stage of a preamplifier. As a result, a SN ratio of a signal is improved by oscillation of the magnetic oscillator occurring when the signal is input.

What is claimed is:

1. An apparatus for receiving radio signal, comprising:
a preamplifier to amplify an input signal;
an equalizer to subject an amplified signal from the preamplifier to an equalization process;
an identification reproducer to reproduce the input signal based on an output signal of the equalizer; and
a magnetic oscillator arranged on a pre-stage of the preamplifier to improve a SN ratio of the input signal, when receiving a received signal the magnetic oscillator generating a voltage ΔV added to a voltage Vol across a resistor Ro between upper and lower electrodes of the magnetic oscillator and oscillating with an amplitude $(2\Delta V)^{1/2}$ and a frequency 2fo in a current domain not less than a threshold current Ith, where fo indicates a resonance frequency of a ferromagnetic layer of the magnetic oscillator.

2. The apparatus according to claims 1, further comprising a bias current source connected to the magnetic oscillator.

3. The apparatus according to claim 1, wherein the magnetic oscillator comprises a magnetic oscillator to oscillate at an oscillation frequency of not less than 10 GHz.

4. The apparatus according to claim 1, further comprising a microwave antenna, a GMR magnetic sensor or a TMR magnetic sensor, which is provided on a pre-stage of the preamplifier.

5. The apparatus according to claim 1, wherein the equalizer is configured to subject the amplified signal of the preamplifier to correction of frequency characteristic, power amplification and cancellation of an out-of-band noise.

6. The apparatus according to claim 1, wherein the magnetic oscillator comprises a laminated structure obtained by laminating a first ferromagnetic layer, a non-magnetic layer and a second ferromagnetic layer in this order.

7. The apparatus according to claim 6, which includes a bias current source connected to the magnetic oscillator.

8. The apparatus according to claim 6, wherein the magnetic oscillator comprises a magnetic oscillator to oscillate at an oscillation frequency of not less than 10 GHz.

9. The apparatus according to claim 6, which includes a microwave antenna, a GMR magnetic sensor or a TMR magnetic sensor, which is provided on a pre-stage of the preamplifier.

10. The apparatus according to claim 6, wherein the equalizer is configured to subject the amplified signal of the preamplifier to correction of frequency characteristic, power amplification and cancellation of an out-of-band noise.

11. The apparatus according to claim 6, wherein at least one of the first ferromagnetic layer and the second ferromagnetic layer has a magnetization vertical to its surface.

12. The apparatus according to claim 11, further comprising a bias current source connected to the magnetic oscillator.

13. The apparatus according to claim 11, wherein the magnetic oscillator comprises a magnetic oscillator to oscillate at an oscillation frequency of not less than 10 GHz.

14. The apparatus according to claim 11, further comprising a microwave antenna, a GMR magnetic sensor or a TMR magnetic sensor, which is provided on a pre-stage of the preamplifier.

15. The apparatus according to claim 11, wherein the equalizer is configured to subject the amplified signal of the preamplifier to correction of frequency characteristic, power amplification and cancellation of an out-of-band noise.

16. An apparatus for receiving radio signal, comprising:
an antenna of radio signal;
a magnetic oscillator coupled to the antenna, when receiving a received signal the magnetic oscillator generating a voltage $\Delta V$ added to a voltage Vol across a resistor Ro between upper and lower electrodes of the magnetic oscillator and oscillating with an amplitude $(2\Delta V)^{1/2}$ and a frequency 2fo in a current domain not less than a threshold current Ith;

an amplifier coupled to the antenna and configured to receive a signal from the antenna, the amplifier and the magnetic oscillator being coupled in parallel;

an equalizer coupled to the amplifier and configured to receive an amplified signal from the amplifier; and a reproducer coupled to the equalizer and configured to receive an output signal of the equalizer and reproduce an output signal of the antenna.

17. The apparatus of claim 16, further comprising a bias current source coupled to the magnetic oscillator.

18. The apparatus of claim 16, further comprising a giant magnetoresistance sensor or a tunnel magnetoresistance sensor, the giant magnetoresistance sensor or the tunnel magnetoresistance sensor being provided between the antenna and the amplifier.

19. The apparatus of claim 16, wherein the equalizer is configured to subject the amplified signal of the amplifier to correction of frequency characteristic, power amplification or cancellation of an out-of-band noise.

20. The apparatus of claim 16, wherein the magnetic oscillator comprises a magnetic layer whose magnetization is substantially perpendicular to surface of the magnetic layer.

* * * * *